United States Patent
Zhang et al.

(10) Patent No.: US 9,344,638 B2
(45) Date of Patent: May 17, 2016

(54) CONSTANT BRACKET HIGH DYNAMIC RANGE (CHDR) OPERATIONS

(71) Applicant: Apple Inc., Cupertino, CA (US)

(72) Inventors: Xuemei Zhang, Mountain View, CA (US); Marius Tico, Mountain View, CA (US); Yingjun Bai, San Jose, CA (US); Farhan A. Baqai, Fremont, CA (US); Fabio Riccardi, Palo Alto, CA (US); Juanqing Chen, San Jose, CA (US); Paul M. Hubel, Mountain View, CA (US); George E. Williams, Pleasanton, CA (US); Todd S. Sachs, Palo Alto, CA (US); Yongfang Liang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,792

(22) Filed: May 30, 2014

(65) Prior Publication Data
US 2015/0350513 A1    Dec. 3, 2015

(51) Int. Cl.
| | |
|---|---|
| H04N 5/225 | (2006.01) |
| H04N 5/235 | (2006.01) |
| G03B 7/00 | (2014.01) |
| H04N 3/14 | (2006.01) |
| H04N 5/335 | (2011.01) |
| H04N 5/228 | (2006.01) |
| H04N 5/91 | (2006.01) |
| G06K 9/46 | (2006.01) |
| G06T 5/00 | (2006.01) |
| H04N 5/265 | (2006.01) |
| H04N 5/232 | (2006.01) |
| G06T 5/40 | (2006.01) |

(52) U.S. Cl.
CPC ............ *H04N 5/2355* (2013.01); *G06K 9/4642* (2013.01); *G06K 9/4661* (2013.01); *G06T 5/001* (2013.01); *G06T 5/009* (2013.01); *G06T 5/40* (2013.01); *H04N 5/23245* (2013.01); *H04N 5/265* (2013.01); *H04N 5/91* (2013.01); *G06T 2207/10144* (2013.01); *G06T 2207/20016* (2013.01); *G06T 2207/20208* (2013.01); *G06T 2207/20221* (2013.01)

(58) Field of Classification Search
CPC ............ H04N 5/2355; H04N 5/35536; H04N 5/35554; H04N 5/2353; H04N 5/2352; H04N 5/2351
USPC .............................. 348/222.1, 218.1, 297, 362
See application file for complete search history.

(56) References Cited

U.S. PATENT DOCUMENTS

| | | | |
|---|---|---|---|
| 8,305,487 B2 | 11/2012 | Cha | |
| 8,339,475 B2 | 12/2012 | Atanassov | |
| 8,391,598 B2 * | 3/2013 | Lin | 382/167 |
| 8,570,394 B1 | 10/2013 | Maeng | |
| 8,570,396 B2 | 10/2013 | Rapaport | |

(Continued)

*Primary Examiner* — Chia-Wei A Chen
(74) *Attorney, Agent, or Firm* — Blank Rome LLP

(57) ABSTRACT

Systems, methods, and computer readable media to capture and process high dynamic range (HDR) images when appropriate for a scene are disclosed. When appropriate, multiple images at a single—slightly underexposed—exposure value are captured (making a constant bracket HDR capture sequence) and local tone mapping (LTM) applied to each image. Local tone map and histogram information can be used to generate a noise-amplification mask which can be used during fusion operations. Images obtained and fused in the disclosed manner provide high dynamic range with improved noise and de-ghosting characteristics.

17 Claims, 4 Drawing Sheets

(56) References Cited

U.S. PATENT DOCUMENTS

| | | |
|---|---|---|
| 8,606,009 B2 | 12/2013 | Sun |
| 2007/0230932 A1 | 10/2007 | Tanaka |
| 2008/0131016 A1* | 6/2008 | Kokemohr ............... 382/254 |
| 2008/0267494 A1* | 10/2008 | Cohen et al. ............. 382/166 |
| 2011/0058050 A1 | 3/2011 | Lasang |
| 2011/0211732 A1 | 9/2011 | Rapaport |
| 2011/0254976 A1 | 10/2011 | Garten |
| 2012/0113130 A1* | 5/2012 | Zhai et al. ............... 345/589 |
| 2012/0170842 A1* | 7/2012 | Liu et al. ................. 382/167 |
| 2012/0188414 A1 | 7/2012 | Ross |
| 2013/0019196 A1 | 1/2013 | Bhatt |
| 2013/0223739 A1 | 8/2013 | Tay |
| 2013/0229546 A1* | 9/2013 | Furumura et al. ........ 348/229.1 |
| 2013/0294689 A1* | 11/2013 | Jia et al. .................. 382/166 |
| 2013/0335596 A1 | 12/2013 | Demandolx |
| 2014/0168486 A1 | 6/2014 | Geiss |
| 2014/0232872 A1* | 8/2014 | Kussel ..................... 348/148 |
| 2014/0369410 A1* | 12/2014 | Olivier et al. ............ 375/240.12 |
| 2015/0092066 A1 | 4/2015 | Geiss |
| 2015/0170389 A1* | 6/2015 | Ming et al. ............... 382/284 |
| 2015/0235371 A1* | 8/2015 | Venkataraman et al. ..... 348/135 |
| 2015/0256734 A1* | 9/2015 | Fukuhara .................. 348/294 |

* cited by examiner

CONSTANT BRACKET HIGH DYNAMIC RANGE (CHDR) OPERATIONS

BACKGROUND

This disclosure relates generally to the field of digital photography. More particularly, it relates to techniques for the capture and processing of high dynamic range images when appropriate for the scene. As used herein, the terms digital camera, digital imaging system or device and the like are meant to refer to any device, apparatus or system that has the ability to capture digital images (still and video).

Today, many personal electronic devices come equipped with digital cameras. Illustrative personal electronic devices include, but are not limited to, mobile phones, personal data assistants, portable music players, laptop computer systems, desktop computer systems, tablet computer systems and wearable electronic devices such as watches and glasses. Image sensors used in these types of devices often have relatively small dynamic ranges. That is, their ability to capture a range of light from total darkness to full sunlight in a single image is limited. Consumer-grade sensors often provide only 8-10 bits resolution. Such sensors can distinguish between 256-1024 different brightness levels (assuming no noise); generally an insufficient number to adequately represent the range of light to which they are exposed. One result of a scene exceeding the sensor's/camera's dynamic range is that pixels are clipped. As the number of clipped pixels increase, there comes a point where the image becomes unpleasant to look at.

High dynamic range imaging (HDRI or HDR) is a set of techniques used by digital capture systems to reproduce a greater dynamic range than is possible using standard single image capture techniques. In particular, HDR images are generally achieved by capturing multiple standard images, often using exposure bracketing in which each image is captured with a different exposure value, which are then merged into a single HDR image. While providing images with an extended dynamic range, these operations do not come for free. When trying to fuse individual captures having different exposure levels into an HDR image, it is very difficult to avoid ghosting when there is subject motion in the scene, even when advanced de-ghosting techniques are used. This is a fundamental limitation of exposure bracketing HDR operations. Because of this limitation, it can be important to employ HDR techniques only when needed.

SUMMARY

This disclosure pertains to systems, methods, and computer readable media to perform a novel HDR capture sequence. In one embodiment, the disclosed subject matter provides a method to obtain a first exposure value (selected to under-expose a scene relative to a neutral or EV0 exposure value), which may then be used to capture multiple images of the scene, all at the first exposure value. Next, one or more tone maps may be obtained for each captured image (where each image has the same number of tone maps). Where each image is associated with more than one tone map, each tone map may be associated with a different region of an image. In one embodiment, the tone maps may be obtained from special purpose hardware configured to work with a device's image capture circuitry. Each tone map may be applied to its corresponding captured image (or portion thereof) to generate tone mapped images and, in some cases, noise information (one tone mapped image for each captured image). In some embodiments, each image may also be obtained with a corresponding (luminance) histogram (each tone map having a corresponding histogram). In such cases, a noise-amplification mask may be generated for each tone mapped image based on the tone mapped image's corresponding tone map and histogram. For clarity, if multiple tone maps and (luminance) histograms are obtained for each image, each histogram corresponds to a distinct portion or region of its corresponding image just as does each tone map. As with the tone maps, the histograms may be generated by the special purpose hardware. A high dynamic range output image may be generated by fusing two or more of the tone mapped images in accordance with their corresponding noise-amplification masks. In one embodiment, the tone mapped images being fused may first be decomposed (e.g., via pyramid or wavelet decomposition), with corresponding layers in the decomposed images combined in accordance with one or both of the decomposed images' noise-amplification masks. Finally, the individually fused layers of the tone mapped images may be reconstructed to generate a HDR composite image which may be stored in a memory and/or displayed.

DETAILED DESCRIPTION

This disclosure pertains to systems, methods, and computer readable media to capture and process high dynamic range (HDR) images when appropriate for the scene using a novel HDR capture sequence. In general, techniques are disclosed for capturing multiple images at a single exposure value (selected to slightly underexpose the scene). Local tone mapping (LTM) may be applied to each image and used, in combination with image luminance information, to develop a noise-amplification mask for use during fusion operations. Images obtained and fused in the disclosed manner provide high dynamic range with improved noise and de-ghosting characteristics.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image capture and processing systems having the benefit of this disclosure.

Figure 1:
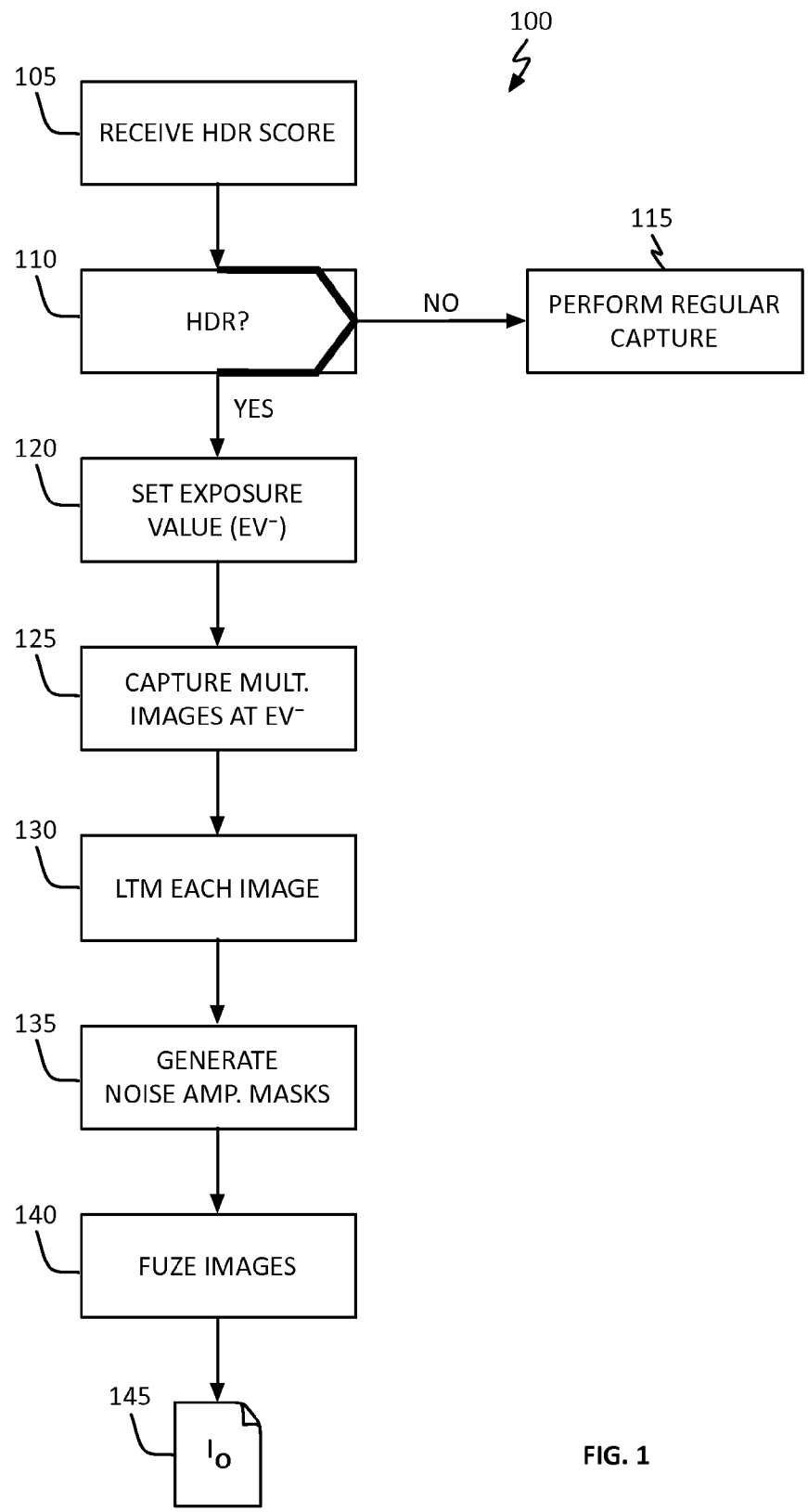
FIG. 1 shows, in block flowchart form, a constant bracket HDR (cHDR) operation in accordance with one embodiment.

Referring to FIG. 1, constant bracket HDR (cHDR) operation 100 in accordance with one embodiment initially receives an HDR score (block 105). For example, the HDR score may represent the likelihood that an image captured in accordance with the current exposure value will have a substantial number of clipped pixels. As used herein, the term "clipped pixel" refers to a pixel whose value is greater than a specified clip-threshold. In embodiments that use 8-bits to represent each pixel channel, if the clip-threshold is 255, any pixel channel whose value is 255 may be considered clipped. In another embodiment, if the clip-threshold is 247, any pixel channel whose value is greater than 247 may be considered clipped. It should be understood that the clip-threshold adopted may depend at least upon the specific image sensor chosen and what the desired use of the image capture device is. If the HDR score indicates EV0 (the exposure value returned by, for example, an auto-exposure module or system) would result in an acceptable number of clipped pixels (the "NO" prong of block 110), the image may be captured in accordance with non-HDR procedures using EV0 (block 115). If the HDR score indicates EV0 would result in an unacceptable number of clipped pixels (the "YES" prong of block 110), an exposure value may be set to slightly underexpose the scene (denoted EV−) so as to reduce the number of clipped pixels to an acceptable level (block 120). In one embodiment, EV− may be set to −½-stop less than indicated by EV0. In another embodiment, EV− may be set to one full-stop less than indicated by EV0. In general, the amount to bias the exposure value may be determined by the specific qualities (e.g., operating characteristics) of the specific image capture system and its intended use. As used herein, a "stop" or "f-stop" refers to an image capture device's f-number (a ratio of the devices focal length to the diameter of it's aperture). The selected EV− may be used to capture multiple images of the scene (block 125). That is, a specified number of images (aka frames) are captured in sequence—each using EV− as determined in accordance with block 120. In one embodiment the specified number of frames may be 3. In another embodiment the specified number of frames may be 4. More generally, the number of frames captured can be any reasonable number as determined by available capture and processing time constraints and the de-noise benefit gained from fusion. Each captured image may then be locally tone mapped (block 130). Local tone mapping (LTM) may use any tone mapping operation that is relevant and beneficial to the chosen operating environment and goals of the image capture device. In general, local tone mapping modifies an image's pixels' noise characteristics—amplifying the noise in some pixels and reducing it in others. In one embodiment, for example, the local tone map operation may be chosen so as to return each image's average brightness to a value approximately equal to that which would have resulted had the image been captured at EV0. In another embodiment, the LTM operation may be chosen so as to return each image's median brightness to a value approximately equal to that which would have resulted had the image been captured at EV0. Each image's LTM may also be used (in combination with the image's luminosity information) to generate a noise-amplification mask (block 135) which may then be used to guide the fusion strength at different locations when fusing the images (block 140) to produce output image $1_o$ 145.

In some embodiments images provided by actions in accordance with block 125 may also have multiple corresponding LTM tone curves (hereinafter, tone curves) and multiple luminosity histograms (hereinafter, histograms). In general, each captured image may have m×n corresponding tone curves and m×n corresponding histograms. In one embodiment, luminosity refers to estimated luminance, while in other embodiments luminosity may refer to a weighted sum of an image's channel values (e.g., a weighted sum of an image's red, green and blue channel values). In still other embodiments, the selected form of luminosity may be further adjusted to fit the need of the target implementation.

In general, if each image provided to noise-amplification mask generation operation 135 has $p_r$ rows and $p_c$ columns of pixels, and each image has m×n tone curves and m×n histograms, each tone curve and each histogram represents an image region that is $(p_r\ m)$-by-$(p_c\div n)$ pixels. By way of example, in an implementation in which images are 3008× 2000 pixels (6 mega-pixels) and m=8 and n=4, each image would have 32 corresponding tone curves and each 32 corresponding histograms, each of which would represent an image region that is 376-by-500 pixels. In similar fashion, where images are 3264×2448 pixels (8 mega-pixels) and m=8 and n=6, each image would have 48 corresponding tone curves, each of which would represent an image region that is 408-by-408 pixels.

Figure 2:
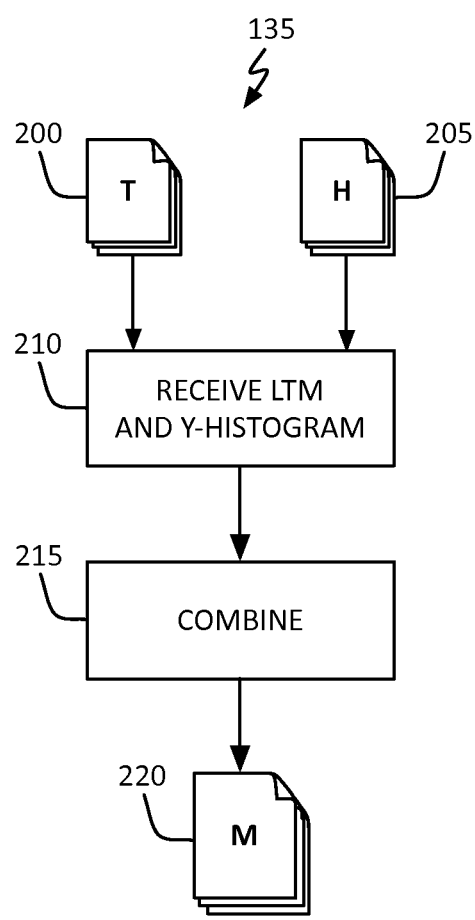
FIG. 2 shows, in flowchart form, a local tone map-derived noise-amplification mask generation operation in accordance with one embodiment.

Referring to FIG. 2, noise-amplification mask generation operation 135 in accordance with one embodiment may receive a collection of tone maps 200 and a collection of histograms 205 (block 210). In one embodiment, there will be 1 tone map and 1 histogram for each captured image. In another embodiment, there are multiple tone maps and multiple histograms for each image (e.g., m×n tone curves and m×n histograms). Combining tone maps 200 and histograms 205, using any relationship that makes sense and is beneficial for a particular implementation's goals (block 215), results in noise-amplification masks 220 (hereinafter, masks). Formally:

$$M=f(T,H),\qquad\qquad\text{EQ. 1}$$

where M represents the collection of masks 220, T represents the collection of all tone curves 200, H the collection of all histograms 205, and f( ) a general function. In one particular embodiment, for example:

$$M=T(\hat{Y})/\hat{Y},\qquad\qquad\text{EQ. 2}$$

where M is as described above, $\hat{Y}$ represents summary luminance values as estimated from the histograms, and $T(\hat{Y})$ represents tone output values corresponding to $\hat{Y}$ based on the tone curves.

In general, if a noise-amplification mask's value (i.e., one of each mask's m×n values) is less than 1, the image pixels corresponding to that mask value had their noise reduced by the local tone mapping operation. If a mask's value is greater than 1, the image pixels corresponding to that mask value had their noise increased by the local tone mapping operation, and if a mask's value is 1, the noise of the image pixels corresponding to that mask value was not changed by the local tone mapping operation. It should be understood that in an actual implementation determination of whether a particular mask value is above or below 1 could use an error threshold, $\Delta$. In one embodiment, values greater than $1+\Delta_U$ may be considered greater than 1, and values less than $1-\Delta_L$ may be considered less than 1, where $\Delta_U$ and $\Delta_L$ values may be determined empirically. In some embodiments $\Delta_U$ may equal $\Delta_L$ while in other embodiments they may be different. Because a mask's resolution is often lower than its corresponding image, a decision of how to treat all the pixels represented by a given mask value needs to be made. In one embodiment, each pixel in a region corresponding to a mask value may be assigned the mask's value. In another embodiment, one or more center pixels in the region corresponding to a mask value may be assigned the mask's value, with values for all of the other pixels in the region being an interpolated value therefrom. While any appropriate approach to assigning a mask's value to its corresponding pixels may be made, it can be beneficial that the adopted approach yield the same value at the boundaries between the different regions. For example, if regions A and B abut, the method used to determine values for region A's pixels and the method used to determine values for region B's pixels should yield the same value for those pixels that make up the border between region A and B.

In one embodiment, $\hat{Y}$ may represent the median luminance of the corresponding image region as determined by H. In another embodiment, $\hat{Y}$ may represent the mean luminance of the corresponding image region as determined by H. In yet another embodiment, $\hat{Y}$ may represent the weighted mean luminance of the corresponding image region as determined by H, where weights may be a function of the region's location with respect to the image at large. For example, regions at the center of an image may be given more weight than regions on the image's periphery.

Figure 3:
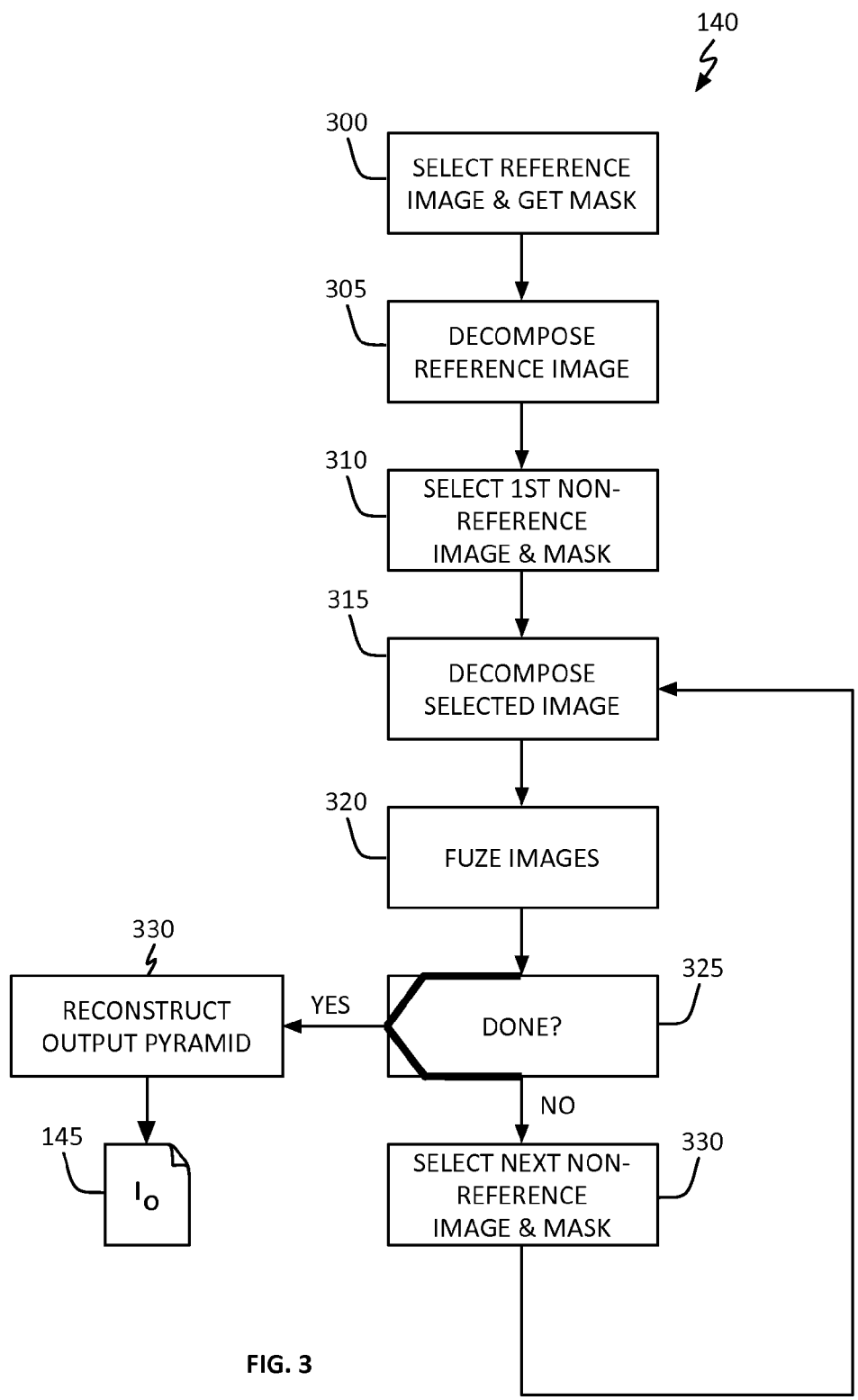
FIG. 3 shows, in flowchart form, an image fusion operation in accordance with one embodiment.

Referring now to FIG. 3, image fusion operation 140 in accordance with one embodiment first selects one of the images captured in accordance with block 125 as a reference image and, in addition, selects the image's corresponding mask (block 300). This selection may be based on any criteria or metric that makes sense for a specific implementation. For instance, in one embodiment the "sharpest" image as determined by an auto-focus process may be selected. In another embodiment, the image determined to have the greatest contrast may be selected. In yet another embodiment, the image judged to have the least associated device motion as determined, for example, by motion sensors may be selected (e.g., a gyroscope or accelerometer). The selected reference image may be decomposed in preparation for fusion (block 305). A first non-reference image from the captured images may then be selected (block 310), along with its corresponding mask, and itself decomposed (block 315). While not necessary for implementation of the disclosed subject matter, images decomposed by actions in accordance with blocks 305 and 315 may use a band-pass pyramid (Laplacian) decomposition scheme. In general, any of a large number of other multi-scale image decomposition schemes may be used including, but not limited to, wavelet and curvet decomposition. Once both images are decomposed, they may be fused level-by-level in accordance with the selected image's mask (block 320). In one embodiment, if $R^{(l)}$ represents the lth level of the reference image's pyramid and $I_1^{(l)}, I_2^{(l)} \ldots I_K^{(l)}$ represents the lth layer of each input image's pyramid (other than the reference image), output corresponding to the fused pyramid's level l may be given as:

$$O^{(l)} = \frac{R^{(l)} + \sum_{k=1}^{K} W_k^{(l)} I_k^l}{1 + \sum_{k=1}^{K} W_k^{(l)}},$$  EQ. 3 where $W_k^{(l)}$ represents a weighting function for the lth level of the kth input image and may be described functionally as:

$$W_k = f(R - I_k, \sigma),$$  EQ. 4 where f( ) is a decreasing function with respect to the absolute value of its first argument and whose value is generally between 0 and 1. In one illustrative embodiment, f( ) may be given as:

$$W_k = e^{\left(-\tau\left(\frac{R-I_k}{\sigma}\right)^2\right)},$$  EQ. 5 where $\tau$ represents a tuning factor that may be adjusted to achieve the desired visual tradeoff between noise and ghosting artifacts (generally based on a large number of test images), and $\sigma$ represents an equivalent noise standard deviation, the value of which may be given as:

$$\sigma = \sqrt{M_R^2 \sigma_R^2 + M_k^2 \sigma_k^2}.$$  EQ. 6

Here, $M_R$ represents the value of the reference image mask at the current pixel and level, $M_k$ represents the kth input image mask at the current pixel and level, $\sigma_R$ represents the noise standard deviation of the reference image at the current pixel and level, and $\sigma_k$ represents the noise standard deviation of the kth input image at the current pixel and level. When each pixel and each level of the reference and currently selected image are processed in this manner, the resulting fused image may be reconstructed from its pyramid levels. Equations 3, 4, 5 and 6 refer to the weight computation of a single pixel at a given layer of a pyramid (the pixel coordinates (x,y) have been omitted to simplify the notation). In EQS. 4, 5 and 6 the level symbol "(l)" has also been omitted to simplify the notation. The masks identified in EQ. 6 are assumed to be scaled to the resolution of a particular pyramid level. As such, there is a value for each mask at every pixel in that particular pyramid level, and that value is used to calculate the noise in that pixel in accordance with EQ. 3. It has been found that masks $M_R$ and $M_k$ are often not very different between images. This recognition may be used to reduce the computational time required for cHDR operation 100 by using only the reference mask. Taking this approach alters EQ. 3 a little; making $M_k$ equal $M_R$.

With fusion of the reference image and currently selected image complete (block 320), a check may be made to determine if all of the images captured in accordance with block 125 have been processed (block 325). If at least one input image has not been processed (the "NO" prong of block 325), the next unprocessed image (not the reference image) and its corresponding mask are selected (block 330), whereafter processing continues at block 315. If all input images have been processed (the "YES" prong of block 325), output image $I_O$ 145 may be reconstructed from the final output pyramids (block 130).

By capturing all images at EV−(using a shorter exposure time than conventional HDR processes for most captured images), cHDR operation 100 exhibits less frame-to-frame blur than prior HDR techniques. Using a single exposure time also makes de-ghosting and fusion more robust. For example, because all images captured in accordance with cHDR operation 100 have a common exposure time, a more aggressive fusion operation may be used. Conventional HDR processes must generally take into account the change in brightness between different images (caused by their differing exposure values) as this causes the same object to appear different in each image making de-ghosting more difficult. In addition, by tone mapping input images early in the image processing sequence, cHDR operations in accordance with this disclosure "lift" an image's intrinsically dark areas prior to other processing such as further tone mapping for output (which typically reduces an image's bit-depth). This permits the retention of more information during image processing. This, in turn, permits better maintenance (recovery) of shadow regions in the final output image than conventional HDR operations.

Figure 4:
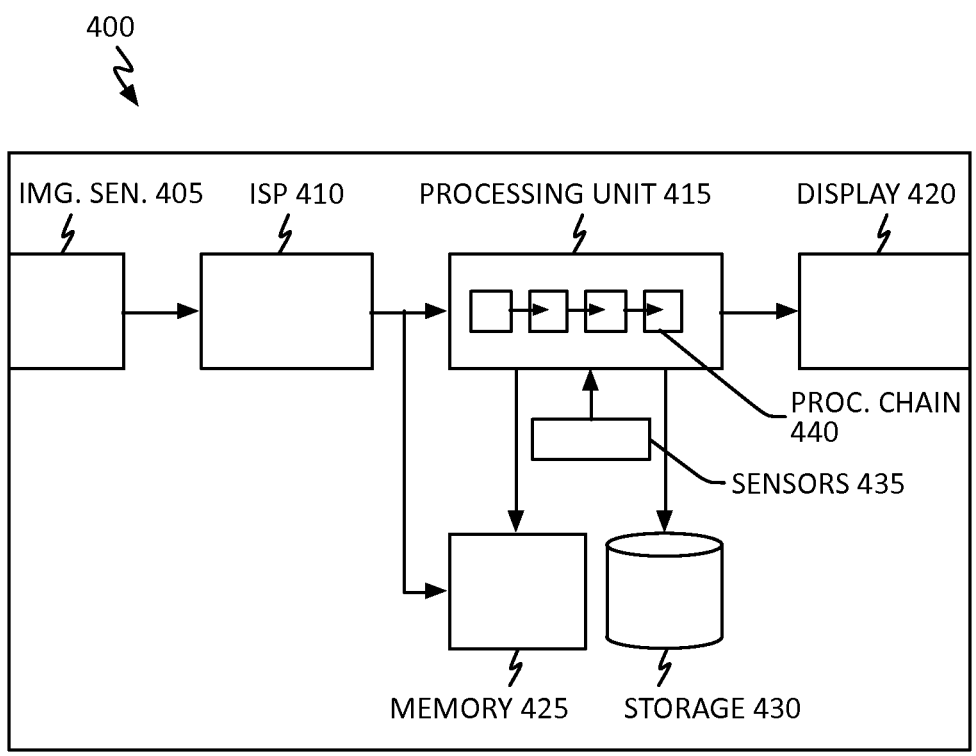
FIG. 4 shows, in block diagram form, an electronic device in accordance with one embodiment.

Referring to FIG. 4, a simplified functional block diagram of illustrative electronic device 400 is shown according to one embodiment. Electronic device 400 could be, for example, a mobile telephone, personal media device, portable camera and/or video camera, a tablet computer system, a notebook computer system, a desktop computer system, or a wearable electronic device such as a watch or a pair of glasses. As shown, electronic device 400 may include image sensor 405, image signal processing (ISP) pipeline 410, processor unit 415, display 420, memory 425, storage 430, and sensors 435. Image sensor 405 may be, for example, a charge-coupled device (CCD) or complementary metal oxide semiconductor (CMOS) sensor. ISP pipeline 410 represents specialized hardware designed to provide a number of pre-determined operations on raw images received from sensor 405 and to place them into memory 425 and/or storage 430 and/or display 420. Processor unit 415 represents one or more processors configured to process images in accordance with instructions stored in memory 425 and/or storage 430, a sequence of which is represented by processing chain 440. Illustrative instructions include those designed to implement, at least in part, operations in accordance with this disclosure. A processor may be a system-on-chip such as those found in mobile devices and can include one or more central processing units based on reduced instruction-set computer (RISC) or complex instruction-set computer (CISC) architectures or any other suitable architecture and may include one or more processing cores. A processor may also include one or more dedicated graphics processing units (GPUs). Display 420 may be used to display images captured by sensor 405 and may also provide a user interface through which many functions of electronic device 400 may be controlled. Memory 425 may include one or more different types of media used by processor unit 415. Memory 425 may, for example, include memory cache, read-only memory (ROM), and/or random access memory (RAM). Storage 430 may store media (e.g., audio, image and video files), computer program instructions or software, preference information, device profile information, and any other suitable data. Storage 430 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 425 and storage 430 may be used to retain computer program instructions or code organized into one or more modules and written in any desired computer programming language. When executed by, for example, a processor in processor unit 415 such computer program code may implement, at least partially, one or more of the methods described herein. Sensors 435 represents one or more sensors coupled to electronic device 400. Illustrative sensors include, but are not limited to, motion sensors (e.g., gyroscopes and accelerometers), sound sensors, and GPS sensors.

Many conventional HDR processes use processor unit 415 to convert image data from ISP 410 into a different format (e.g., RGB format) and, in that format, perform alignment, de-ghosting and fusion operations including the application of local tone mapping. Operations in accordance with this disclosure (e.g., cHDR operation 100) allow ISP 410 to perform local tone mapping and mask generation operations. Only then does cHDR operation 100 fuse images. Because ISP 410 is used to perform a majority of operations, the described cHDR operation can be faster and consume less power than conventional HDR methods. In addition, because cHDR operation 100 applies local tone mapping early (via specialized hardware 410), a larger dynamic range is possible in the final output image—again as compared to conventional HDR operations.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, tone maps may be based on functions other than the mean and median values of luminance histograms as described herein. Further, in some embodiments various steps, acts or actions may be omitted, repeated, and/or performed in a different order than that shown in FIGS. 1, 2 and 3. Accordingly, the specific arrangement of steps or actions shown in FIGS. 1, 2 and 3 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to capture an image, comprising:
    obtaining a first exposure value for an image capture device, wherein the first exposure value is adapted to under-expose a scene relative to a neutral exposure value;
    capturing, using the image capture device, a plurality of images of the scene at the first exposure value;
    obtaining, for each of the plurality of images, a corresponding tone map;
    applying each tone map to its corresponding image to generate a corresponding plurality of tone mapped images;
    generating a mask for each tone mapped image based on the tone map of each tone mapped image's corresponding image;
    fusing two or more of the tone mapped images, based on each tone mapped image's mask, to generate a high dynamic range (HDR) composite image; and
    storing the HDR composite image in a memory.

2. The method of claim 1, wherein obtaining, for each of the plurality of images, a corresponding tone map further comprises obtaining, for each of the plurality of images, a corresponding luminosity histogram.

3. The method of claim 2, wherein generating a mask for each tone mapped image comprises:
    identifying a corresponding tone map and luminosity histogram for each of the tone mapped image's corresponding image; and
    generating a mask based on the corresponding tone map and luminosity histogram.

4. The method of claim 3, wherein fusing two or more of the tone mapped images comprises:
    selecting a first of the plurality of tone mapped images;

selecting a second of the plurality of tone mapped images;
decomposing each of the first and second tone mapped images into first and second decomposed images each having a corresponding plurality of layers;
combining each layer of the first decomposed image with a corresponding layer of the second decomposed image, based on the masks of each of the first and second tone mapped images, to generate a corresponding plurality of fused layers; and
reconstructing the corresponding plurality of fused layers to generate the (HDR) composite image.

5. The method of claim 3, wherein fusing two or more of the tone mapped images comprises:
selecting a first of the plurality of tone mapped images;
selecting a second of the plurality of tone mapped images;
decomposing each of the first and second tone mapped images into first and second decomposed images each having a corresponding plurality of layers;
combining each layer of the first decomposed image with a corresponding layer of the second decomposed image, based on the mask of the first tone mapped image, to generate a corresponding plurality of fused layers; and
reconstructing the corresponding plurality of fused layers to generate the (HDR) composite image.

6. The method of claim 2, wherein each luminosity histogram is comprised of a weighted combination of each image's color channels.

7. The method of claim 1, wherein:
obtaining for each of the plurality of images a corresponding tone map comprises, obtaining, for each of the plurality of images, a corresponding plurality of tone maps; and
obtaining for each of the plurality of images a corresponding luminosity histogram comprises, obtaining, for each of the plurality of images, a corresponding plurality of luminosity histogram.

8. The method of claim 7, wherein generating a mask for each tone mapped image comprises
identifying the corresponding plurality of tone maps and corresponding plurality of luminosity histograms; and
generating a mask based on the corresponding plurality of tone maps and the plurality of corresponding luminosity histograms.

9. The method of claim 8, wherein fusing two or more of the tone mapped images comprises:
selecting a first of the plurality of tone mapped images;
selecting a second of the plurality of tone mapped images;
decomposing each of the first and second tone mapped images into first and second decomposed images each having a corresponding plurality of layers;
combining each layer of the first decomposed image with a corresponding layer of the second decomposed image, based on the mask of the first tone mapped image, to generate a corresponding plurality of fused layers; and
reconstructing the corresponding plurality of fused layers to generate the (HDR) composite image.

10. A non-transitory program storage device comprising instructions stored thereon to cause one or more processors to:
obtain a first exposure value for an image capture device, wherein the first exposure value is adapted to underexpose a scene relative to a neutral exposure value;
capture, using the image capture device, a plurality of images of the scene at the first exposure value;
obtain, for each of the plurality of images, a corresponding tone map;
apply each tone map to its corresponding image to generate a corresponding plurality of tone mapped images;
generate a mask for each tone mapped image based on the tone map of each tone mapped image's corresponding image;
fuse two or more of the tone mapped images, based on each tone mapped image's mask, to generate a high dynamic range (HDR) composite image; and
store the HDR composite image in a memory.

11. The non-transitory program storage device of claim 10, wherein instructions to cause the one or more processors to obtain, for each of the plurality of images, a corresponding tone map further comprise instructions to cause the one or more processors to obtain, for each of the plurality of images, a corresponding luminosity histogram.

12. The non-transitory program storage device of claim 11, wherein the instructions to cause the one or more processors to generate a mask for each tone mapped image comprise instructions to cause the one or more processors to:
identify a corresponding tone map and luminosity histogram for each of the tone mapped image's corresponding image; and
generate a mask based on the corresponding tone map and luminosity histogram.

13. The non-transitory program storage device of claim 12, wherein the instructions to cause the one or more processors to fusing two or more of the tone mapped images comprise instructions to cause the one or more processors to:
select a first of the plurality of tone mapped images;
select a second of the plurality of tone mapped images;
decompose each of the first and second tone mapped images into first and second decomposed images each having a corresponding plurality of layers;
combine each layer of the first decomposed image with a corresponding layer of the second decomposed image, based on the mask of the first tone mapped image, to generate a corresponding plurality of fused layers; and
reconstruct the corresponding plurality of fused layers to generate the (HDR) composite image.

14. An electronic device, comprising:
an image capture unit;
a display;
a memory communicatively coupled to the image capture unit and the display; and
one or more processors communicatively coupled to the image capture unit and the memory, and the display, and configured to execute instructions stored in the memory to cause the one or more processors to—
obtain a first exposure value for an image capture device, wherein the first exposure value is adapted to underexpose a scene relative to a neutral exposure value,
capture, using the image capture device, a plurality of images of the scene at the first exposure value,
obtain, for each of the plurality of images, a corresponding tone map,
apply each tone map to its corresponding image to generate a corresponding plurality of tone mapped images,
generate a mask for each tone mapped image based on the tone map of each tone mapped image's corresponding image,
fuse two or more of the tone mapped images, based on each tone mapped image's mask, to generate a high dynamic range (HDR) composite image, and
store the HDR composite image in the memory.

15. The electronic device of claim 14, wherein instructions to cause the one or more processors to obtain, for each of the plurality of images, a corresponding tone map further comprise instructions to cause the one or more processors to obtain, for each of the plurality of images, a corresponding luminosity histogram.

16. The electronic device of claim 15, wherein the instructions to cause the one or more processors to generate a mask for each tone mapped image comprise instructions to cause the one or more processors to:
   identify a corresponding tone map and luminosity histogram for each of the tone mapped image's corresponding image; and
   generate a mask based on the corresponding tone map and luminosity histogram.

17. The electronic device of claim 16, wherein the instructions to cause the one or more processors to fusing two or more of the tone mapped images comprise instructions to cause the one or more processors to:
   select a first of the plurality of tone mapped images;
   select a second of the plurality of tone mapped images;
   decompose each of the first and second tone mapped images into first and second decomposed images each having a corresponding plurality of layers;
   combine each layer of the first decomposed image with a corresponding layer of the second decomposed image, based on the mask of the first tone mapped image, to generate a corresponding plurality of fused layers; and
   reconstruct the corresponding plurality of fused layers to generate the (HDR) composite image.

* * * * *